United States Patent [19]
Klemm

[11] 3,882,858
[45] May 13, 1975

[54] SURGICAL SYNTHETIC-RESIN MATERIAL AND METHOD OF TREATING OSTEOMYELITIS

[75] Inventor: Klaus Klemm, Frankfurt/Main, Germany

[73] Assignee: Merck Patent Gesellschaft mit beschraenkter Haftung, Darmstadt, Germany

[22] Filed: Apr. 17, 1974

[21] Appl. No.: 461,654

[30] Foreign Application Priority Data
Apr. 21, 1973  Germany............................ 2320373

[52] U.S. Cl.................... 128/92 G; 128/334 R; 3/1
[51] Int. Cl. ............................................ A61f 5/04
[58] Field of Search . 128/92 G, 92 R, 92 C, 92 CA, 128/92 BC, 1 R, 334 R; 3/1; 32/10 A

[56] References Cited
UNITED STATES PATENTS

| | | | |
|---|---|---|---|
| 3,030,951 | 4/1962 | Mandarino | 128/92 G |
| 3,223,083 | 12/1965 | Cobey | 128/92 R |
| 3,609,867 | 10/1971 | Hodosh | 32/10 A |

Primary Examiner—Ronald L. Frinks
Attorney, Agent, or Firm—Millen, Raptes & White

[57] ABSTRACT

Osteomyelitis is treated by filling an osteomyelitic cavity with particles of 1–20 mm diameter of a polymethacrylate, polyacrylate or copolymer thereof which is impregnated with gentamycin or other antibiotic. Particles of such antibiotic impregnated polymer joined together by a thread or wire are particularly useful for this purpose.

15 Claims, No Drawings

SURGICAL SYNTHETIC-RESIN MATERIAL AND METHOD OF TREATING OSTEOMYELITIS

BACKGROUND OF THE INVENTION

It is known that antibiotics, especially gentamycin, are prolonged released from polymethacrylates and/or polyacrylates plastics. Initially, there is a steep drop in antibiotic concentration as a manifestation of the release from the outermost layers of the plastic, followed by an almost constant release which gradually decreases over a long period of time. These antibiotic-containing plastics have been utilized as bone cement for the attachment of endoprostheses, e.g., total hip endoprostheses, or in the replacement of infected endoprostheses. To fight infection and to forestall infection, the antibiotics are added prior to the final polymerization of the plastic.

G. R. Hessert and G. Ruckdeschel, Arch. Orthop. UnfallChir. 68, 249–254, 1970 (J. F. Bergmann, Munchen, Pub.) describe the formation of cylindrical particles of polymethylmethacrylate 3 mm in height and 5.5 mm in diameter impregnated with gentamycin sulfate or a tetracycline or a synthetic penicillin to measure antibiotic release rate in a laboratory study of such impregnated plastics, which the authors report are useful as a cement to reduce infection rates in total prosthetic replacement of joints.

Polymers containing an antibiotic have also been used as drugs with sustained release for oral administration.

It has now been found that synthetic resin particles in the form of granules or small spheres and impregnated with an antibiotic are useful as surgical implantation devices.

SUMMARY OF THE INVENTION

In its method of use aspect, this invention relates to a method of treating osteomyelitis which comprises implanting in an osteomyelitic cavity sterile particles having a diameter of 1–20 mm. of a solid physiologically acceptable bone cement, preferably consisting essentially of polymethacrylate, a polyacrylate or copolymer thereof, impregnated with at least one topically effective antibiotic.

In an article of manufacture aspect, this invention relates to a surgical device adapted for implantation into a wound comprising particles of a solid physiologically acceptable polymethacrylate, polyacrylate or copolymer thereof impregnated with an antibiotic joined together by a physiologically acceptable thread or wire.

DETAILED DISCUSSION

Surprisingly, novel effects which could not be foreseen can be attained according to the method of this invention.

The use of particulate antibiotic-impregnated polymers as surgical implant material in the treatment of osteomyelitis has not been known, although antibiotic-containing polymers have been described. Usually such materials have been used as ingested medical agents with a protracted release of the antibiotic or related to the stabilization of these agents. However, as stated above, their use as cements for the attachment of endoprosthetic devices has also been reported.

We have now found that particulate antibiotic-impregnated polymers as defined herein are suitable for filling osteomyelitic cavities. Surprisingly, connective tissue sprouts into the interstices between the plastic particles. The material is thus incorporated, in spite of the infection, just as in an aseptic environment. Furthermore, the novel agent is suitable to create an aseptic transplant substrate for a possibly subsequently effected introduction of spongiosa from the patient's own body. The novel agents are also suitable for the open filling of osteomyelitic cavities if a primary skin closure is impossible. The uppermost layer of the particles can then be lifted and the particles disposed therebelow are extensively surrounded by connective tissue, so that a skin transplant becomes possible.

In several operations which were conducted very successfully, it was found that granulation tissue is formed in the wound cavities packed with the novel surgical material wherein tiny plastic spheres are embedded in fine connective-tissue capsules. This results in a sanitization of the center of infection without changing the elasticity and/or stability of the bone. During the filling of osteomyelitic cavities as conducted heretofore, fillings of a plastic material have always been used which replace the bone defect with respect to volume but have an adverse effect on the bone elasticity. A removal of these heretofore customary bone cement fillers, as is necessary in some cases, is naturally possible only under very great difficulties. In contrast thereto, the agent of this invention can remain in the cavity. By the special configuration of the novel surgical material, the natural stress and stability properties of the bone and its loadbearing capacity are not altered. Optimum, heretofore unattainable effects can be obtained using particle material as defined herein. In particular, an optimum filling of the bone cavities can be accomplished without any use of pressure. Herein resides a further special advantage, for example, as compared to the use of fillings of foamed synthetic resins. Also, in the latter, there is the danger that still lowmolecular weight materials in the foamed resin will diffuse out and damage the patient.

Finally, a quite special advantage of the material of the present invention is that, in contrast to the conventional fillings (plugs), an unhindered drainage of secretions is ensured. This is of particular importance in operations of this type, since drainage must be provided for blood after the operation as well as for the pus caused by the dimishing infection.

It will be apparent to those skilled in the art that the exact chemical structure of the polymer and the specific antibiotic employed is not critical. With respect to the antibiotic, its sole requirement is that it be both topically active and physiologically acceptable. It must be sufficiently soluble in body fluids so as to be leachable from the polymer. It must also be active against one or more osteomyelitis-producing microorganisms. When a heat-generating step is used to produce the final antibiotic-impregnated polymer, in order to be successfully incorporated into the polymer, the antibiotic will, of course, have to be sufficiently stable to such heat to retain at least some of its initial activity. The antibiotic must also be stable with respect to the polymer. In other respects, this invention does not require the use of any specific antibiotic and both known and yet-to-be discovered antibiotics can be employed therein.

The polymer must, as stated above, be compatible, i.e., inert, with respect to the selected antibiotic and must be physiologically acceptable, i.e., not irritating to internal tissue when implanted in the patient. Polymers of this type are well known in the art. For example, the polymers largely used as bone cements are particularly suitable. Such bone cements based on polyacrylates and/or polymethacrylates (usually designated as acrylic cement) are, for instance, available under the trademark PALACOS, especially PALACOS R, manufactured by KULZER & CO, Bad Homburg, Federal Republic of Germany; or C.M.W. -Bone cement, sold by C.M.W. Laboratories Ltd, Blackpool FY4 4QF; or Surgical Simplex P Radiopaque Bone Cement, marketed also in the United States and which is reported to have the following composition:

"One component is an ampul containing 20 ml. of a colorless, flammable liquid monomer that has a sweet, slightly acrid odor and has the following composition:

| | |
|---|---|
| Methylmethacrylate (monomer) | 97.4% v/v |
| N,N-dimethyl-p-toluidine | 2.6% v/v |
| Hydroquinone | 75 ±15 ppm. |

Hydroquinone is added to prevent premature polymerization which may occur under certain conditions; e.g., exposure to light, elevated temperatures. N,N-dimethyl-p-toluidine is added to promote cold curing of the finished therapeutic compound. The liquid component is sterilized by membrane filtration. The other component is a packet of 40 g. of finely divided white powder (mixture of Polymethylmethacrylate, Methyl methacrylate-Styrene copolymer and Barium Sulfate, U.S.P.) of the following composition:

| | |
|---|---|
| Polymethyl methacrylate | 15.0% w/w |
| Methyl methacrylate-Styrene copolymer | 75.0% w/w |
| Barium Sulfate, U.S.P. | 10.0% w/w |

The powder component is sterilized by gamma irradiation. At the time of use the powder and liquid are mixed, resulting in the exothermic polymeric formation of a soft, pliable, dough-like mass. As the reaction progresses, within a few minutes a hard, cement-like complex is formed."

PALACOS, especially PALACOS R, has a very similar composition with respect to the plastic material except that instead of the methyl methacrylate-styrene copolymer, it contains a methylmethacrylate / methylacrylate copolymer.

Polymethacrylates and/or polyacrylates suitable for surgical purposes are known. For example, a very popular commercial product for making bone cement contains two bags, each containing about 40 g. of powder, and 2 ampoules, each containing 20 ml. of liquid. The powder is fine beads (particle diameter <30 µ) of the copolymer derived from methyl methacrylate and methyl acrylate. About 0.5 percent of dibenzoyl peroxide is added to the powder as the catalyst. In order to mark the material, traces of chlorophyll are incorporated during the polymerization. The powder can additionally contain zirconium dioxide, for example, as a radiopaque agent. The associated liquid consists of monomeric methyl methacrylate containing about 0.7 percent of dimethyl p-toluidine as the accelerator, as well as traces of hydroquinone as a stabilizer. This liquid is usually also dyed with traces of chlorophyll for marking purposes. The powder is packaged in polyethylene bags and sterilized with ethylene oxide. The liquid is filtered and filled into glass ampoules under aseptic conditions.

When mixing together 2 parts by weight of the powder and 1 part by weight of the liquid, the dibenzoyl peroxide reacts with the dimethyl p-toluidine in the liquid, whereby free radical polymerization is initiated. After about 1 minute, the mixture becomes a doughy paste. This paste remains kneadable for about 4 minutes and then begins to cure with heat development. After 6 minutes, polymerization is essentially terminated. During the elastic phase, the shaping is executed, so that the surgical material is obtained in the form of a granulated substance or in the form of small spheres having a maximally uniform surface and particle diameter.

The particle diameters can vary from 1 to 20 mm., preferably about 5 to 15 mm. For special applications, other sizes can also be utilized. For example, when filling large cavities and when subsequent removal is planned, larger particles are used, for example with a diameter of 15-16 mm. In case of smaller cavities and when the material is to be permanently implanted, smaller particle diameters are preferred in most cases, e.g., approximately 5 mm. The granulated material or preferably small spheres can be produced immediately prior to the operation or can be provided in finished stored form. Of course, sterility must always be preserved.

In a special embodiment of this invention, the particles are joined together by means of a thread or wire. This can be done, for example, by producing perforated spheres (beads) or by threading the synthetic-resin material, as long as it is still in the deformable condition, like beads on a cord or a wire, or by pressing the thread into the beads. Suitable as the thread is any desired surgical suture material or a high-alloy steel wire, such as conventionally used in bone surgery. Such a product has the advantage that it can be manipulated more easily during the operation and can be removed more readily in case of a second operation. Also, for the first time, it is possible to effect a temporary filling in case of a preliminary dressing. Since surgical wire is radiopaque, it is possible, for example, to more easily remove the particles from the connective tissue bed, when this is desired. It is also possible to temporarily introduce the agents of this invention into a marrow cavity, for example after removal of a marrow pin due to medullary cavity phlegmona.

For the production of the antibiotic-impregnated polymer, an antibiotic is incorporated into the synthetic resin prior to curing. Suitable for this purpose are all antibiotics which are not damaged by the temperatures occurring during curing and which are released as desired from the synthetic resin. However, since the polymerization to form the small particles of this invention provides a larger surface area and thus an improved removal of the heat of polymerization, this is not a critical requirement. Basically, any antibiotic, individually or in a mixture with one another, which is essentially stable thermally at the temperatures occurring during the polymerization, can be utilized. Thus, the antibiotics should withstand temperatures of up to 80° C., usually about 60°–80° C., for up to about 10 minutes without substantial loss in activity. The antibiotic must also be chemically stable with respect to the synthetic resins employed. The spectrum of effectiveness of the antibiotics can encompass gram-positive or gram-negative bacteria, but preferably encompasses both groups. Thus, the broad spectrum antibiotics are preferred. When possible, an antibiotic is employed to which the bacteria causing the osteomyelitis only slowly develops resistance thereto.

Examples of the large number of suitable antibiotics are erythromycin, lincomycin, clindamycin, novobiocin, bacitracin, vancomycin, fusidic acid, rifampicin, the polymyxins, neomycin, kanamycin, kanendomycin, tobramycin, lividomycin, sisomycin and the antibiotics known as BBK 8, DKB and AHB-DKB. Gentamycin is especially suitable. The penicillins, the cephalosporins and other macrolide antibiotics can be used. Due to their broad antibacterial spectrum and their thermal stability, the aminoglucoside antibiotics are especially suitable.

Gentamycin, for example, is an aminoglucoside antibiotic effective against both gram-positive and gram-negative bacteria. Since both gram-negative and gram-positive can sustain a chronic osteomyelitis, this antibiotic has already been used in case of osteomyelitis, exploiting its local or systemic effect. Moreover, it is known that gentamycin is released especially advantageously from polymethacrylates and/or polyacrylates synthetic resins. The very high water solubility of this antibiotic apparently has a very advantageous effect on a diffusion from the synthetic resin. The high diffusion power makes it possible to obtain, after an initial larger drop in concentration, an almost constant release which decreases only gradually over an extraordinarily long period of time. Thus, even after months, sufficient protection is still ensured. This is a great advantage over the heretofore customary treatment of chronic osteomyelitis wherein antibiotics are applied by installation or irrigation drainage. The antibiotic must work against the efflux of secretions from the cavity and, as a result, the final branchings of the fistular system are not reached. An irrigation drainage can normally be maintained only over a very limited period of time, because the drainage hoses soon become clogged.

The effectiveness of the antibiotics is not to be affected adversely either by the manufacture of the surgical material, for example the curing process, or by the physical characteristics of the synthetic-resin material. Various publications have reported the behavior of gentamycin (gentamycin sulfate and gentamycin base) in this respect. Details of such investigations are found, for example, in "Langenbecks Archiv fuer Chirurgie" [Langenbeck's Archive for Surgery] 331, pp. 169–212, 1972, Springer publishers, Berlin-Heidelberg. The examinations on the release of the antibiotics from the agents of this invention extend to concentration tests in serum, urine and drainage specimens.

As compared to the previous utilization of an antibioticcontaining bone cement, the novel surgical material has the additional advantage that the synthetic resin is cured before introduction into the body. Thus, the evolution of heat during the polymerization, produced in the bone tissue, is eliminated, which means that the operation can be effected more gently, since no additional damage of the less blood-suffused bed for the filling can occur. Also, since the plastic is cured extracorporally, the danger of residual monomers being liberated during the operation is lessened, thus eliminating a potential risk to the cardiovascular system.

The amount of antibiotic incorporated into the polymer can be varied within wide ranges and depends essentially on the activity of the antibiotic. In general, about 0.2 – 20 percent by weight of antibiotics, based on the polymer, is employed. For gentamycin, for example, between 1 and 5 percent by weight has proved to be particularly favorable (calculated on the basis of the gentamycin base). The other antibiotics are likewise admixed preferably in amounts adequate with respect to their antimicrobial activity. The most popular commercial packages containing powdered and liquid copolymer ingredients can have admixed thereto, for example, 0.5 g. or 1 g. of gentamycin per approximately 60 g. of polymer (40 g. of powder and 20 ml. of liquid). However, it is also possible to choose other proportions of antibiotics or mixtures of antibiotics. For example, a substantially greater quantity of added substance can be necessary if a relatively small cavity is to be filled but a certain minimum effective dosage of the antibiotic must be introduced. Since a possible alteration of the mechanical properties of the plastic material due to the addition of the antibiotic does not play an important part in case of the surgical material of this invention, the amounts of antibiotic which is incorporated into the polymer can be dictated solely from a therapeutic viewpoint. If the infective germ changes or becomes resistant to the incorporated antibiotic, it is possible to readily remove the polymeric agent of this invention and replace it, if desired, by another agent containing one or more different antibiotics.

The novel surgical material is to be utilized primarily for the treatment of chronic osteomyelitis. During the operation, the entire necrotic bone substance and/or tissue is first removed from the wound cavity. The thus-produced hole is then carefully filled with the loose beads of antibioticimpregnated polymer and/or beads attached to threads or wires are inserted. Because of the small size of the particles, optimum filling of the cavity is possible.

A very rapid disappearance of the purulent secretion is observed. Open cavities filled with the agent of this invention show no irritation at all and manifest no signs of inflammation. As an expression of the freedom of infection, the particles are gradually encased by connective tissue. Moreover, the position of the particles can be very well controlled, since the plastic particles are clearly visible by X-rays. Furthermore, the growth of osteoblasts and the formation of new bone tissue in the interstices between the plastic particles are observed.

The antibiotic-impregnated particulate polymer of this invention is also suitable for the prophylaxis of infections in cases of greatly contaminated, extended wounds to soft parts or crushed-bone zones with open bone fractures, as they occur frequently, for example, in accidents. In these cases, the agents act along the lines of a temporary filling for a potentially infected wound cavity with uncertain skin covering. Accordingly, it has been possible for the first time to apply antibiotics in depot form locally, i.e., directly to the infected or endangered locations. Moreover, the application can be interrupted at will and can also be repeated in a controlled procedure. In case of larger wounds, the introduction of mutually joined particles is especially simple, since in such instance all particles can be removed effortlessly by pulling on the end of a thread.

This process opens up entirely novel procedures for the treatment of wounds with antibiotics.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

40 g. of a sterile, fine bead polymer (particle diameter <30 $\mu$), consisting of a copolymer of methyl methacrylate and methyl acrylate. This material is sold by Kulzer and Co, Bad Homburg, Germany, under the registered trade-mark PALACOS R.

The polymer contained additionally 0.5 percent of dibenzoyl peroxide, traces of chlorophyll, and 15 percent of zirconium dioxide as a radiopaque agent. The polymer is thoroughly mixed with 0.5 g. of gentamycin sulfate. The thus-obtained powder is then mixed with 20 ml. of a liquid consisting of monomeric methyl methacrylate plus about 0.7 percent of dimethyl p-toluidine and about 0.006 percent of hydroquinone. From the paste produced after thorough intermixing, small spheres are formed having a diameter of about 7 mm. After about 6 minutes, the particles are cured. Optionally, a sterilization can follow this step, for example by exposing the particles to gaseous ethylene oxide. The beads can then be utilized for filling osteomyelitic cavities.

EXAMPLE 2

Analogously to Example 1, small spheres are formed with a diameter of about 7–10 mm. The addition of gentamycin sulfate is 1 g. per 60 g. of polymer. Prior to complete curing, the thus-obtained particles are threaded with spacings of about 2 mm., like beads on a thread (surgical high-alloy wire) having a diameter of about 0.1 mm. The particles are threaded by the wire.

The beads are allowed to cure in this condition. When filling osteomyelitic cavities, the "string of beads" can be cut at any desired length.

EXAMPLE 3

Analogously to Example 1, a granulated material is produced with particles of an average diameter of 6–8 mm. Prior to polymerization, 0.5 g. of erythromycin and 1 g. of neomycin are introduced. The thus-obtained particulate product can be employed for filling osteomyelitic cavities.

EXAMPLE 4

Analogously to Example 1, 40 g. of the bead polymer is mixed with 2 g. of tobramycin (based on the base). After adding 20 ml. of the liquid containing the monomer, the polymerization is conducted, and beads are formed, having a diameter of 12–16 mm. These beads can be threaded analogously to Example 2 on a surgical, flexible stainless steel wire, whereby manipulation during surgery is facilitated.

EXAMPLE 5

Analogously to Example 1, plastic beads are formed having a diameter of 8–12 mm. Prior to polymerization, 40 g. of the bead polymer is mixed with 4 g. of lividomycin (based on the base). The thus-obtained particulate product can be utilized for filling osteomyelitic cavities.

EXAMPLE 6

A surgical material is produced analogously to Example 3, employing 0.5 g. of lincomycin in place of the erythromycin.

EXAMPLE 7

An operation was carried out with a patient suffering for more than ten years from a fistula laterally above the knee-joint. X-ray diagrams showed a cherry-great osteomyelitic cavity.

During the operation, excision of the fistula was performed, followed by evacuation of the osteomyelitic cavity and abrasion of the flabby granulations distally up to the cartilage of the joint. The cavity (size like a walnut) then was filled up with the particles described in Example 1. The wound was closed in the usual way. Healing was fast and the mobility was increasing rapidly. The fistula remained closed and the patient had no further complaints. The X-ray diagram showed the cavity filled up with the bone cement particles.

EXAMPLE 8

A similar operation was performed with a patient suffering from osteomyelitis in the hip. After usual preparation of the cavity, it was filled up with the bone cement material described in Example 2. No further infection could be observed following this operation. The elasticity and stability of the bone was recured. The X-ray diagram showed the wire with the bone cement particles in a cavity with sharp and clearly visible demarcations of the marginal surface.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of treating osteomyelitis which comprises implanting in an osteomyelitic cavity sterile particles having a diameter of 1 – 20 mm. of a solid physiologically acceptable bone cement impregnated with at least one topically effective antibiotic.

2. A method according to claim 1 wherein the particles have a diameter of 5–15 mm.

3. A method according to claim 1 wherein the bone cement is consisting essentially of polymethacrylate, a polyacrylate or copolymer thereof.

4. A method according to claim 3 wherein the particles are a copolymer of methyl methacrylate and methyl acrylate.

5. A method according to claim 1 wherein the antibiotic is gentamycin.

6. A method according to claim 1 wherein the particles are impregnated with about 0.2 – 15 percent by weight of antibiotic.

7. A method according to claim 1 wherein the particles are impregnated with about 1–4 percent by weight of gentamycin, calculated as gentamycin base.

8. A method according to claim 1 wherein individual particles of the polymer are connected by a surgically acceptable thread or wire.

9. A method according to claim 8 wherein the particles have a diameter of 5–15 mm. and are joined together by a surgically acceptable thread or wire.

10. A surgical device adapted for implantation into a wound comprising particles of a solid physiologically acceptable bone cement impregnated with an antibiotic joined together by a physiologically acceptable thread or wire.

11. A surgical device according to claim 10 wherein the particles have a diameter of 5–15 mm.

12. A surgical device according to claim 10 wherein the bone cement is consisting essentially of polymethacrylate, polyacrylate or copolymer thereof.

13. A surgical device according to claim 10 wherein the antibiotic is gentamycin.

14. A surgical device according to claim 10 wherein the particles are impregnated with about 0.2 – 15 percent by weight of antibiotic.

15. A surgical device according to claim 10 wherein the particles are impregnated with about 1–4 percent by weight of gentamycin, calculated as gentamycin base.

* * * * *